United States Patent
Badami et al.

(10) Patent No.: US 7,140,119 B2
(45) Date of Patent: Nov. 28, 2006

(54) MEASUREMENT OF FORM OF SPHERICAL AND NEAR-SPHERICAL OPTICAL SURFACES

(75) Inventors: Vivek G. Badami, Pittford, NY (US); John H. Bruning, Pittsford, NY (US)

(73) Assignee: Corning Incorporated, Corning, NY (US)

( * ) Notice: Subject to any disclaimer, the term of this patent is extended or adjusted under 35 U.S.C. 154(b) by 3 days.

(21) Appl. No.: 10/830,672

(22) Filed: Apr. 23, 2004

(65) Prior Publication Data

US 2005/0235507 A1   Oct. 27, 2005

(51) Int. Cl.
*G01B 5/20* (2006.01)
(52) U.S. Cl. .............................. 33/507; 33/503; 33/551; 33/555
(58) Field of Classification Search ................... 33/507, 33/503, 549, 550, 551, 553, 554, 555, 556, 33/28, 200, 21.1, 21.2, 555.1
See application file for complete search history.

(56) References Cited

U.S. PATENT DOCUMENTS

| | | | | |
|---|---|---|---|---|
| 2,843,939 A * | 7/1958 | Aller | ............................. | 33/548 |
| 3,747,219 A * | 7/1973 | Moore | .......................... | 33/555 |
| 3,842,713 A * | 10/1974 | Hamilton et al. | ........... | 409/132 |
| 4,807,152 A * | 2/1989 | Lane et al. | .................. | 700/247 |
| 4,976,043 A * | 12/1990 | Bieg | ............................. | 33/551 |
| 5,357,450 A | 10/1994 | Hemmerle et al. | .... | 364/551.01 |
| 6,026,583 A * | 2/2000 | Yoshizumi et al. | ........... | 33/503 |
| 6,175,813 B1 * | 1/2001 | Purchase et al. | ............ | 702/157 |
| 6,354,012 B1 * | 3/2002 | Pettersson | ..................... | 33/503 |
| 6,453,730 B1 * | 9/2002 | Takemura | ..................... | 73/105 |
| 6,546,640 B1 * | 4/2003 | Okada et al. | .................. | 33/503 |
| 6,758,085 B1 * | 7/2004 | Nagaike et al. | ................ | 73/104 |
| 6,874,243 B1 * | 4/2005 | Hama et al. | ................... | 33/551 |
| 6,886,264 B1 * | 5/2005 | Sakata et al. | .................. | 33/502 |
| 6,895,682 B1 * | 5/2005 | Sohn et al. | .................... | 33/554 |
| 6,901,677 B1 * | 6/2005 | Smith et al. | ................... | 33/551 |
| 6,909,983 B1 * | 6/2005 | Sutherland | ................... | 702/104 |

FOREIGN PATENT DOCUMENTS

DE    10019962 A1    3/2001

OTHER PUBLICATIONS

Karow HH, "Fabrication Mehtods for Precision Optics"; Wiley, pp. 390-397; 1993.

(Continued)

*Primary Examiner*—Diego Gutierrez
*Assistant Examiner*—Amy R. Cohen
(74) *Attorney, Agent, or Firm*—Timothy M. Schoeberle

(57) ABSTRACT

Rotational motions between a displacement-measuring probe and an optical test surface define a spherical or near spherical datum surface against which measurements of the probe are taken. The probe has a measurement axis that is maintained substantially normal to the optical test surface during the course of measurement.

5 Claims, 7 Drawing Sheets

OTHER PUBLICATIONS

Malacara D, "Optical Shop Testing"; 2d ed., Wiley, pp. 51-94; 1992.

Offner A and Malacara D, in Optical Shop Testing, 2d ed. Malacara, D ed., Wiley, pp. 427-452, 1992.

Creath K and Wyant JC in Optical Shop Testing, 2d ed., Malacara, D. ed., Wiley, pp. 604-611, 1992.

Ibid, "Two-Wavelength and Multiple-Wavelength Techniques", Holographic and Speckle Tests pp. 612-616.

Fan, YJ et al; "Stitching Interferometry for the Measurement of Aspheric Surfaces," CIRP Annals., 46 (1), pp. 459-462, 1997.

Ghozeil I in Optical Shop Testing, 2d ed., Malacara, D. ed., Wiley, pp. 367-396, 1992.

Creath K and Morales A in Optical Shop Testing, 2d ed. Malacara, D. ed, Wiley, pp. 687-714, 1992.

Grejda, RD, "Use and Calabration of Ultra-Precision Axes of Roatation with Nanometer Level Metrology," Ph.D. Dissertation, The Pennsylvania State University, 2002.

ANSI/ASME B89.3.4M, Axes of Rotation; Methods for Specifying and Testing, American Society of Mechanical Engineers, 1985 (1992).

Donaldson RR. A Simple Method for Separating Spindle Error from Test Ball Roundness Error, CIRP Annals, 21 (1), pp. 125-126, 1972.

* cited by examiner

MEASUREMENT OF FORM OF SPHERICAL AND NEAR-SPHERICAL OPTICAL SURFACES

BACKGROUND OF THE INVENTION

1. Field of the Invention

Within the field of metrology, the invention contemplates the measurement of spherical and near-spherical optical surfaces with surface scanning based instruments.

2. Description of Related Art

The manufacture of precision optical surfaces requires high accuracy measurements of surface form. Generally, both reflective and refractive precision optical surfaces have a spherical form. However, many modern optical systems such as those used for micro-lithography applications include aspheric optical surfaces that depart somewhat from the spherical form to provide higher order optical manipulations.

A number of systems have been developed for measuring such near-spherical optical surfaces to required precision. These include both optical and non-optical systems. The optical systems typically use interferometric techniques, which include comparing a reference wavefront having the nominal shape of an optical test surface with a similarly shaped interrogating wavefront that is reflected from the optical test surface. The interrogating wavefront acquires characteristics of the optical test surface, which are revealed within interference patterns formed with the reference wavefront. Difficulties arise with accurately producing the two wavefronts and with arranging the interrogating wavefront to approach the optical test surface at normal incidence. The measurement of aspheric test surfaces using spherical reference and interrogating wavefronts is limited by issues of fringe density, resulting from a mismatch between the local shapes of the incident interrogating wavefront and the optical test surface. Such issues as aliasing and loss of contrast at a detector can result. Additional optical elements can be used to better match the reference and test wavefronts to the aspheric test surface. However, achieving the required accuracy for these null elements can be problematic. The accuracy is limited because the performance of the null elements is inferred rather than actually measured.

Two-wavelength interferometry has also been used to resolve ambiguities arising from high fringe densities. However, these techniques generally sacrifice resolution for range. Wavefront stitching can be used to measure larger areas by assembling limited zones of measurement over an optical test surface, for example, extended shapes such as hyper-hemispheres typically require the test surfaces to be illuminated from different positions to obtain partially overlapping interferograms of the surface, which must then be stitched together to form a map of the entire surface. These procedures are time consuming, computationally intensive, and subject to positioning errors.

Point-by-point profilometry is also used for measuring optical test surfaces by tracking probe displacements across the surfaces. Two problems compromise this approach. First, the fidelity of datum surfaces traced by the mechanical motions is subject to error. Second, probe performance degrades as the probe deviates from a normal orientation to the test surface.

BRIEF SUMMARY OF THE INVENTION

Our invention provides for making precision measurements of spherical and near-spherical optical surfaces by moving a displacement-measuring probe around two rotational axes for generating an accurate datum surface and by maintaining the displacement-measuring probe substantially normal to the optical surface for making comparative measurements to the datum surface. The rotational axes impart motion with high accuracy, and the residual errors tend to be highly repeatable. In addition, the rotational axes maintain the displacement-measuring probe in a near normal orientation, which allows more probe styles to be used. Both convex and concave surfaces can be measured, and larger angular coverage of surfaces, such as hyper-hemispheres, can be measured in a single set up.

The displacement-measuring probe can be relatively rotated around a first of two rotational axes, tracing a circle in space, and the displacement-measuring probe together with the first rotational axis can be relatively rotated around a second of the two rotational axes, generating a spherical surface in space. The generated spherical surface can be used as a datum surface for referencing measurements of the displacement-measuring probe. The displacement-measuring probe is preferably rotated around the first rotational axis and an optical test surface is preferably rotated around the second rotational axis so that by combining the two rotations, the displacement-measuring probe generates a spherical datum surface.

The measurement axis of the displacement-measuring probe is preferably maintained substantially normal to the spherical datum surface. This can be accomplished by inclining the measurement axis of the displacement-measuring probe with respect to the first rotational axis through the same inclination angle that the first and second rotational axes are inclined to each other.

The optical test surface is preferably mounted so that its center of curvature is located at the intersection of the two rotational axes. Rotation of the measurement axis around the first rotational axis preferably sweeps out a cone having its apex at the center of curvature of the test surface. It is the measuring end or tip of the displacement-measuring probe that traces a circle lying on the conical surface. The relative rotation of the first rotational axis around the second rotational axis generates a spherical datum surface having a center of curvature coincident with the center of curvature of the test surface. A best-fit spherical datum surface generally provides a sufficient approximation of an aspheric test surface for limiting the range of measurement required of the displacement-measuring probe. Small variations from normal incidence (i.e., the inclination of the measurement axis to the surface normal) along with a limited range of displacement measurements along the measurement axis can be accommodated by the choice of displacement-measuring probe. Additional axes of motion can generate more complex datum surfaces.

The invention is particularly applicable to the measurement of optical elements with surfaces having a nominal axis of symmetry. One embodiment of the invention presents an instrument including a fixture for mounting an optical element having an optical test surface with a nominal axis of symmetry. A displacement-measuring probe having a measurement axis is oriented for measuring displacements substantially normal to the test surface. A first rotary drive relatively rotates the displacement-measuring probe with respect to the fixture around a first rotational axis oriented for intersecting the nominal axis of symmetry of the test surface. A second rotary drive relatively rotates the fixture with respect to the displacement-measuring probe around a second rotational axis oriented along the nominal axis of symmetry of the test surface. The measurement axis of the displacement-measuring probe is offset from the first rotational axis through a sweep radius so that the relative rotation of the displacement-measuring probe around the first rotational axis imparts both linear and angular motions to the displacement-measuring probe with respect to the fixture. A controller references motions of the first and second rotary drives so that the relative motion of the displacement-measuring probe with respect to the fixture traces a datum surface against which the displacement-measuring probe measures deviations of the test surface along the measurement axis.

Rotary encoders or other angular measuring devices can be used to monitor the angular positions of the rotational axes for mapping the datum surface. Displacement measurements taken by the probe are referenced to the coordinates of the datum surface, each as a deviation from the datum surface at a particular location on the surface.

The accuracy of the measurement of the test surface is in part based on the accuracy of the datum surface traced in space by the tip of the displacement-measuring probe. The invention provides for enhancing the accuracy of the datum surface in a variety of ways. First, using rotational axes, which are more accurate and repeatable than corresponding pairs of rectilinear axes, enhances the accuracy. Second, the errors of rotational axes tend to be highly repeatable, and such systematic errors can be measured and used to more accurately define the datum surface. Third, sensors can be attached to the rotational axes during use for detecting dynamic errors for further defining the datum surface. Fourth, centration and other mounting issues of the test surface can be monitored and corresponding corrections made by taking redundant measurements of overlapping areas of the test surface from different angular positions of the rotational axes. For example, the measurements of the same points on the test surface can be taken from opposite sides of the mounting fixture.

Preferably, the first rotary drive includes a probe spindle that rotates the displacement-measuring probe around the first rotational axis, and the second rotary drive includes a work spindle that rotates the fixture around the second rotational axis. A number of setup adjustments can be made for accommodating a range of different size and shape test surfaces. For example, a first angular adjuster varies the angular orientation between the first and second rotational axes through a head angle. A second angular adjuster varies the angular orientation of the measurement axis with respect to the first rotational axis through a probe angle. Preferably, the head angle and the probe angle are equal angles so that the measurement axis intersects the first and second rotational axes at a nominal center of curvature of the test surface. The head angle is preferably an acute angle for measuring a range of test surfaces having both convex and concave curvatures.

Other setup axes include three linear adjusters. A first linear adjuster relatively varies the position of the fixture with respect to the displacement-measuring probe along a first adjustment axis having a substantial component in the direction of the second rotational axis. A second linear adjuster relatively varies the position of the fixture with respect to the displacement-measuring probe along a second adjustment axis having a substantial component normal to the first rotational axis. The first and second linear adjustment axes provide for appropriately positioning the optical test surface with respect to the generated datum surface. A third linear adjuster (offset adjuster) varies an offset spacing between the measurement axis and the first rotational axis through a sweep radius, which sets the size of the circle traced by the tip of the displacement-measuring probe.

Different test surface radii of curvature are accommodated by varying either or both of the head angle between rotational axes and the sweep radius of the displacement-measuring probe from the first rotational axis. For example, increases in the test surface's radius of curvature can be accommodated by decreasing the head angle or by increasing the sweep radius. Preferably, the measurement axis is adjusted along with the head angle to maintain the measurement axis nominally normal to the test surface.

The controller can provide for operating the first and second rotary drives in synchronism through an angular or timed relationship of relative position or speed. For example, the second rotary drive (work spindle) can be rotated at a constant velocity for rotating the test surface around its axis of symmetry, while the first rotary drive (probe spindle) is rotated in a timed relationship with the second rotary drive to produce an orderly generation of the datum surface. The displacement-measuring probe can be rotated through full circular sweeps or can be rotated through limited angular amounts.

With both rotational axes operating at full rotation in synchronism, complete coverage of the test surface is generally obtained over several revolutions of the work and probe spindles. Large data sets with considerable redundant data can be obtained in this way. Averaging over these large data sets can be used to reduce statistical variations and systematic errors in the measurement, including error motions of rotational axes and angular position errors. The two rotational axes can also be timed together in different ways, such as when less than a full rotation of the probe spindle is made. For example, the first rotational axis (probe spindle) can be intermittently indexed through a predetermined angular increment for every one or more revolutions of the second rotational axis (work spindle). Redundant data can be required over multiple revolutions of the work spindle while the probe spindle remains stationary. The data set is assembled from a series of concentric circular profiles on the test surface. Alternatively, the first rotational axis (probe spindle) can be continuously indexed at a rate considerably less than the rotation of the second rotational axis (work spindle) so that the displacement-measuring probe traces a spiral on the test surface. In this way, the entire test surface can be measured through less than a single rotation of the displacement-measuring probe around the first rotational axis (probe spindle). Both rotational axes can be intermittently indexed, such as by setting the head angle at 90 degrees and by taking meridional sweeps of the displacement-measuring probe over the test surface.

Our preferred instrument for measuring spherical and aspherical surfaces includes a generating apparatus having two relatively inclined rotational axes that relatively rotate a displacement-measuring probe with respect to an optical test surface for generating a datum surface against which displacement measurements between the displacement-measuring probe and the optical test surface are referenced. The displacement-measuring probe has a measurement axis that is linearly offset and angularly inclined with respect to one of the rotational axes for maintaining the measurement axis of the displacement-measuring probe substantially normal to the optical test surface while generating the datum surface. Preferably, the displacement-measuring probe is a non-contacting probe that can accommodate limited range of orientations departing from normal to the test surface. Such orientations include both deviations of the datum surface from the desired datum surface and deviations of the actual test surface from the desired test surface.

A preferred method for measuring optical test surfaces having a nominal axis of symmetry includes relatively rotating a displacement-measuring probe with respect to an optical test surface around two relatively inclined rotational axes so that the relative motion of the displacement-measuring probe traces a datum surface against which the optical test surface can be measured. The measurement axis of the displacement-measuring probe is oriented with respect to one of the two rotational axes so that the measurement axis remains substantially normal to the optical test surface while tracing the datum surface. Preferably, the two relatively inclined rotational axes are oriented with respect to each other and the test optical surface so that the two rotational axes intersect at a nominal center of curvature of the test surface. One of the two rotational axes is preferably oriented along the nominal axis of symmetry of the test surface. The other rotational axis intersects the nominal axis of symmetry at the center of curvature of the test surface. A range of test surfaces having differing radii of curvature can be accommodated by either offsetting the measurement axis of the displacement-measuring probe from the one rotational axis through a sweep radius or by angularly adjusting the two rotational axes with respect to each other around an orthogonal adjustment axis through a head angle. Angular positions of the rotational axes are measured for mapping the datum surface and for referencing displacement measurements of the displacement-measuring probe to the datum surface.

BRIEF DESCRIPTION OF THE SEVERAL VIEWS OF THE DRAWING(S)

DETAILED DESCRIPTION OF THE INVENTION

Figure 1:
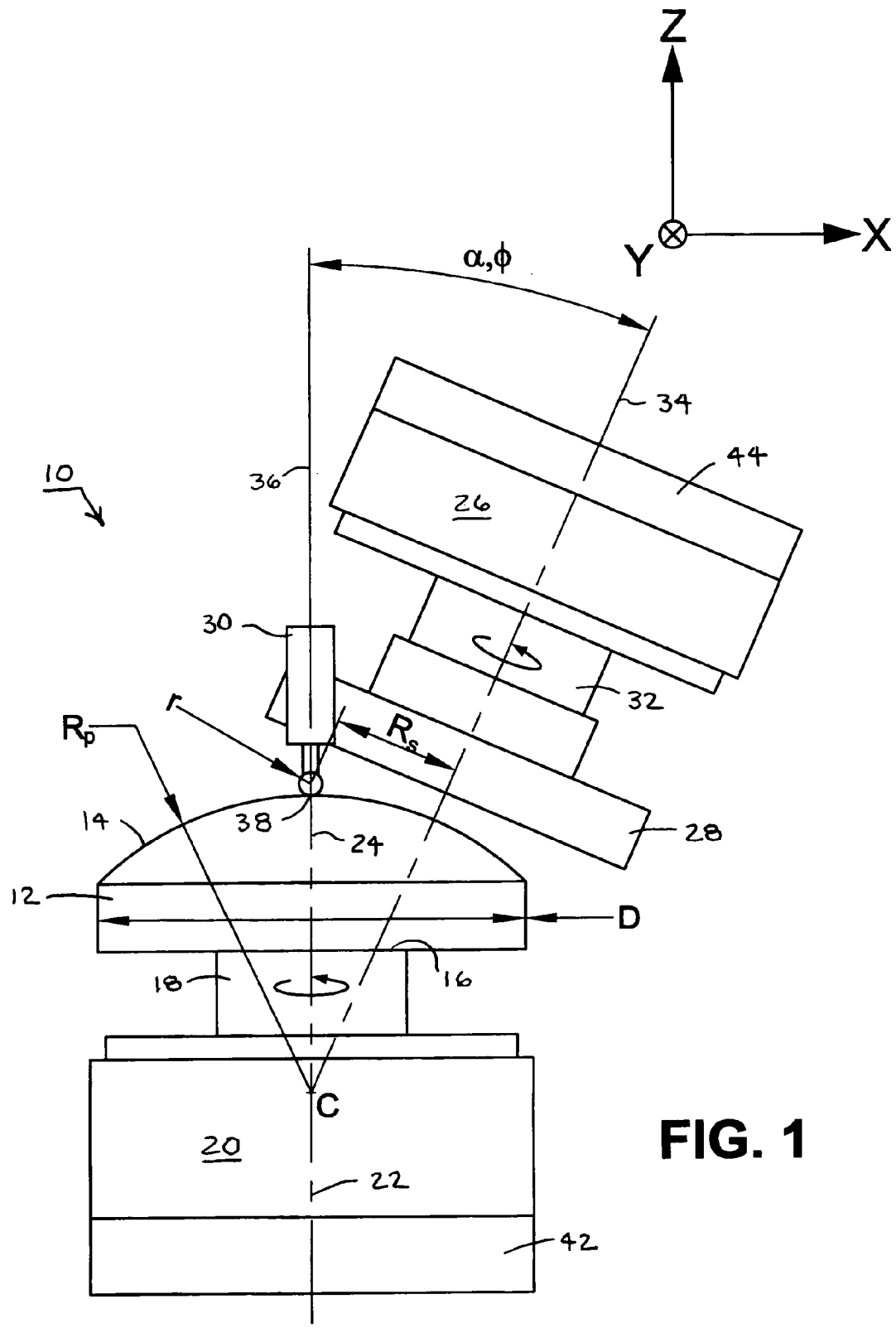
FIG. 1 is diagram showing a cross-sectional side view of an instrument for practicing the invention featuring a generating apparatus having two operational rotational axes.

An exemplary instrument 10 for practicing the invention is shown in the drawing figures in various configurations and operating modes for measuring a range of spherical and aspherical optical surfaces. In FIG. 1, an optical element 12 having a convex optical test surface 14 is mounted on a fixture 16 at one end of a work spindle 18. The work spindle 18 is a part of a rotary drive 20 for rotating the optical element 12 around a rotational axis 22. The optical test surface 14 is mounted so that its center of curvature C lies along the rotational axis 22 and its nominal axis of symmetry 24 is coincident with the rotational axis 22.

The fixture 16 mounting the test surface 14 is preferably a chuck such as a vacuum or mechanical chuck that permits of centration and angular orientation adjustments of the optical element 12 with respect to the rotational axis 22 of the work spindle 18. In addition, the optical element 12 is preferably rotatable within the fixture 16 to permit the implementation of conventional reversal techniques for removing error contributions of the work spindle 18.

An adjustment fixture 28 supports a displacement-measuring probe 30 on a probe spindle 32, which is part of a rotary drive 26 that rotates the displacement-measuring probe 30 together with the probe spindle 32 around a rotational axis 34. The rotational axis 34 lies in the same plane as the rotational axis 22 and intersects the rotational axis 22 at the center of curvature C of the optical test surface 14.

The displacement-measuring probe 30 has a measurement axis 36 and a probe tip 38 for taking measurements along the measurement axis 36. Although depicted as a mechanical displacement probe, a variety of contacting and non-contacting displacement-measuring probes can be used for the practice of the invention. The contact probes can include stylus and scanning probe devices, and the non-contacting probes can include optical probes (both interferometric and confocal) and others based on capacitance, eddy current, and other measurable characteristics of displacement. The choice of probe can be based upon such considerations as surface finish, element material, range, resolution, and measurement uncertainty. Displacement-measuring probes combining mechanical and optical or other kinds of instrumentation can also be used, such as probes that measure mechanical displacements interferometrically. Linear variable differential transformers are also contemplated for this purpose.

The adjustment fixture 28 provides for linearly and angularly adjusting a measurement axis 36 of the displacement-measuring probe 30 with respect to the rotational axis 34. The probe tip 38 is linearly offset from the rotational axis 34 through a sweep radius $R_S$, and the measurement axis 36 is inclined to the rotational axis 34 through a probe angle $\alpha$. Preferably, the probe angle $\alpha$ through which the measurement axis 36 is inclined is equal to a head angle $\phi$ through which the rotational axis 34 is inclined with respect to the rotational axis 22, so that the measurement axis 36 also passes through the center of curvature C of the optical test surface 14. Thus, rotation of the measurement axis 36 around the rotational axis 34 sweeps a conical surface having its apex at the center of curvature C of the test surface 14. The probe tip 38 traces a circle lying on the cone.

Rotating the optical test surface 14 around the rotational axis 22 with respect to the displacement-measuring probe 30 is the kinematic equivalent of rotating the displacement-measuring probe 30 together with the rotational axis 34 around the rotational axis 32 with respect to the test surface 14. The resulting relative motion between the probe tip 38 and the test surface 14 traces a spherical datum surface having its center coincident with the center of curvature C of the test optical surface 14. The instantaneous position of the probe tip 38 on the datum surface can be referenced by angular measures taken by rotary encoders 42 and 44 of the rotary drives 20 and 26.

The radius $R_p$ of the generated spherical datum surface is a function of the head angle $\phi$ and the sweep radius $R_S$ as well as the radius r of the probe tip as follows:

$$R_p = \frac{R_s}{\sin(\phi)} - r$$

where r is positive for convex surfaces and negative for concave surfaces.

Figure 2:
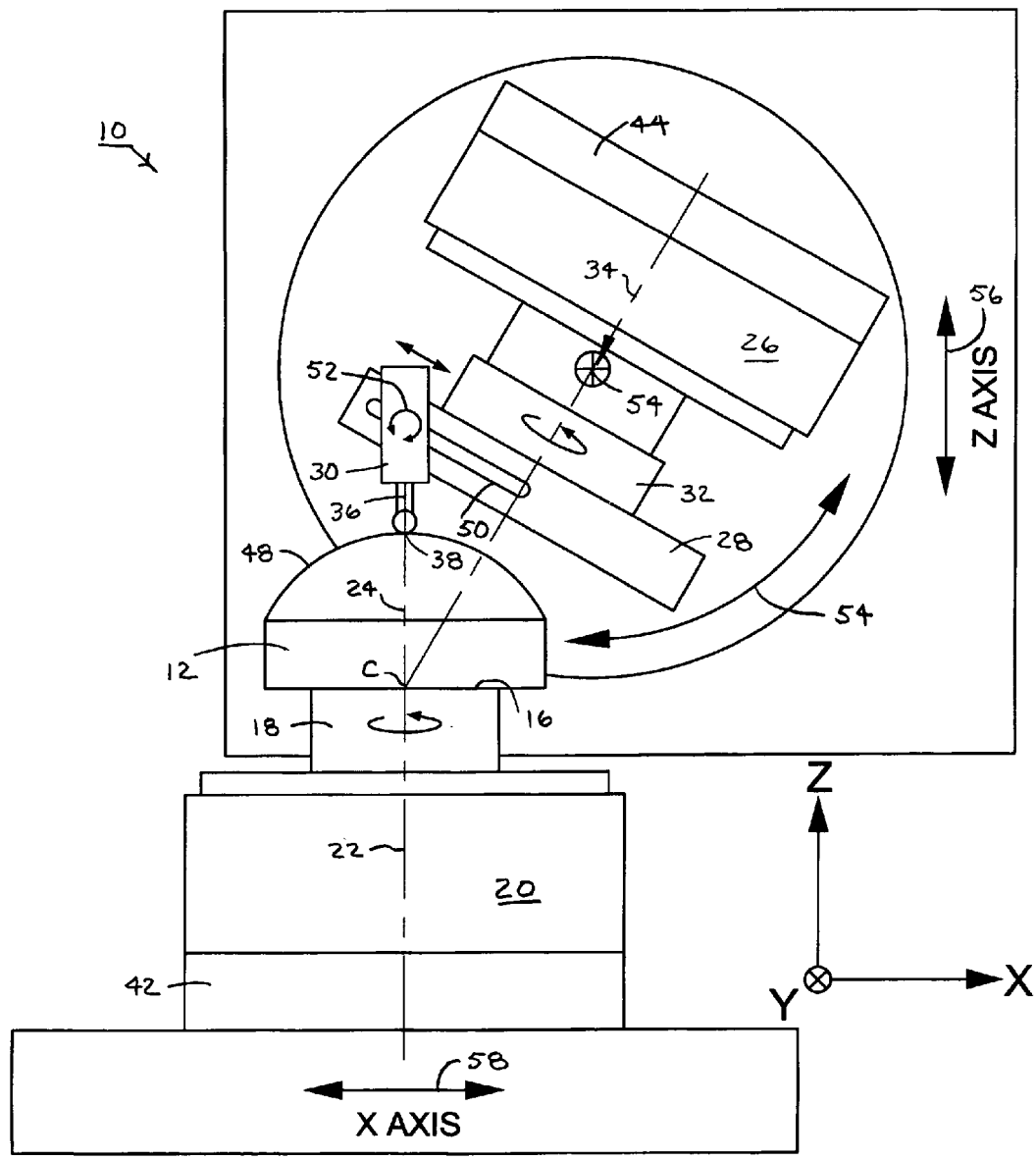
FIG. 2 is a diagram that appends to the generating apparatus of FIG. 1 a combination of angular and linear setup axes arranged for the measurement of a convex optical test surface in a generating mode.

FIG. 2 shows additional setup axes particularly arranged for measuring a convex optical test surface 48 in an optical generator mode. For example, the probe adjustment fixture 28 is shown having a linear adjustment axis 50 for setting the sweep radius $R_s$ and an angular adjustment axis 52 for setting the probe angle α. An angular adjuster 54 provides for inclining the rotational axis 34 of the probe spindle 32 through the head angle φ. Alternatively, the rotational axis 22 of the work spindle 18 could be inclined to the rotational axis 34 of the probe spindle 22 through an opposite head angle φ for achieving the same kinematic effect.

Two linear setup axes are also provided for positioning the displacement-measuring probe 30 in proximate contact with the optical test surface 48. These include two linear adjusters 56 and 58 having orthogonal axes Z and X that lie in the common plane of the rotational axes 22 and 34. The linear adjuster 56 moves the rotational axis 34 of the probe spindle 32 with respect to the work spindle 18 along the axis Z coincident with the rotational axis 22 of the work spindle 18. The linear adjuster 58 moves the rotational axis 22 of the work spindle 18 with respect to the probe spindle 32 along the orthogonal axis X within the same referenced XZ plane.

Operating in a generator mode, the rotary drives 20 and 26 of the work spindle 18 and the probe spindle 22 are driven in synchronism. The rates of rotation of the work spindle 18 and probe spindle 32 can be varied with respect to each other while defining the same spherical datum surface. However, the rates are preferably optimized for collecting data in a prescribed sequence. Only a single (or even partial) rotation of one of the spindles 18 or 32 in combination with a multitude of rotations of the other spindle 32 or 18 can be used to define the points of the datum surface referenced for measurement. Multiple rotations of both spindles 18 and 32 can be used for collecting redundant data to measure not only errors in the test surface 48 but also systematic errors of the optical generating apparatus.

The displacement-measuring probe 30 measures local displacements of the test surface 14 with respect to the datum surface generated by the relative motions of the displacement-measuring probe 30 and the test surface 14. The measured displacements measure not only the departure of the test surface 14 from a desired reference surface but also the departure of the generated datum surface from the desired reference surface. Unintended departures of the generated datum surface from the desired reference surface include systematic errors. To minimize such systematic errors, the invention provides for generating the datum surface by using rotational axes and by minimizing the number of axes required to impart the required motion. Preferred rotary drives for imparting the required motions include appropriately decoupled motor drives. Such rotary drives are preferred for their high accuracy and repeatability. Systematic errors in the rotary drives can be measured and compensations made for their predictable effects upon the datum surface.

Additional sensors (not shown) can be coupled to the two spindles 18 and 32 to monitor dynamic variations as well. The dynamic sensors (gages) can be arranged to measure errors associated with each of the degrees of freedom exhibited by each of the two spindles 18 and 32—i.e., two radial error motions, one axial error motion, and two tilt error motions. A minimum of five sensors is required to monitor all of these freedoms exhibited by each spindle 18 and 32. However, preference can be given to monitor freedoms found to have a most direct effect on the generation of the datum surface. For example, errors normal to the datum surface are expected to be much more significant than errors that lie on the datum surface.

Figure 3:
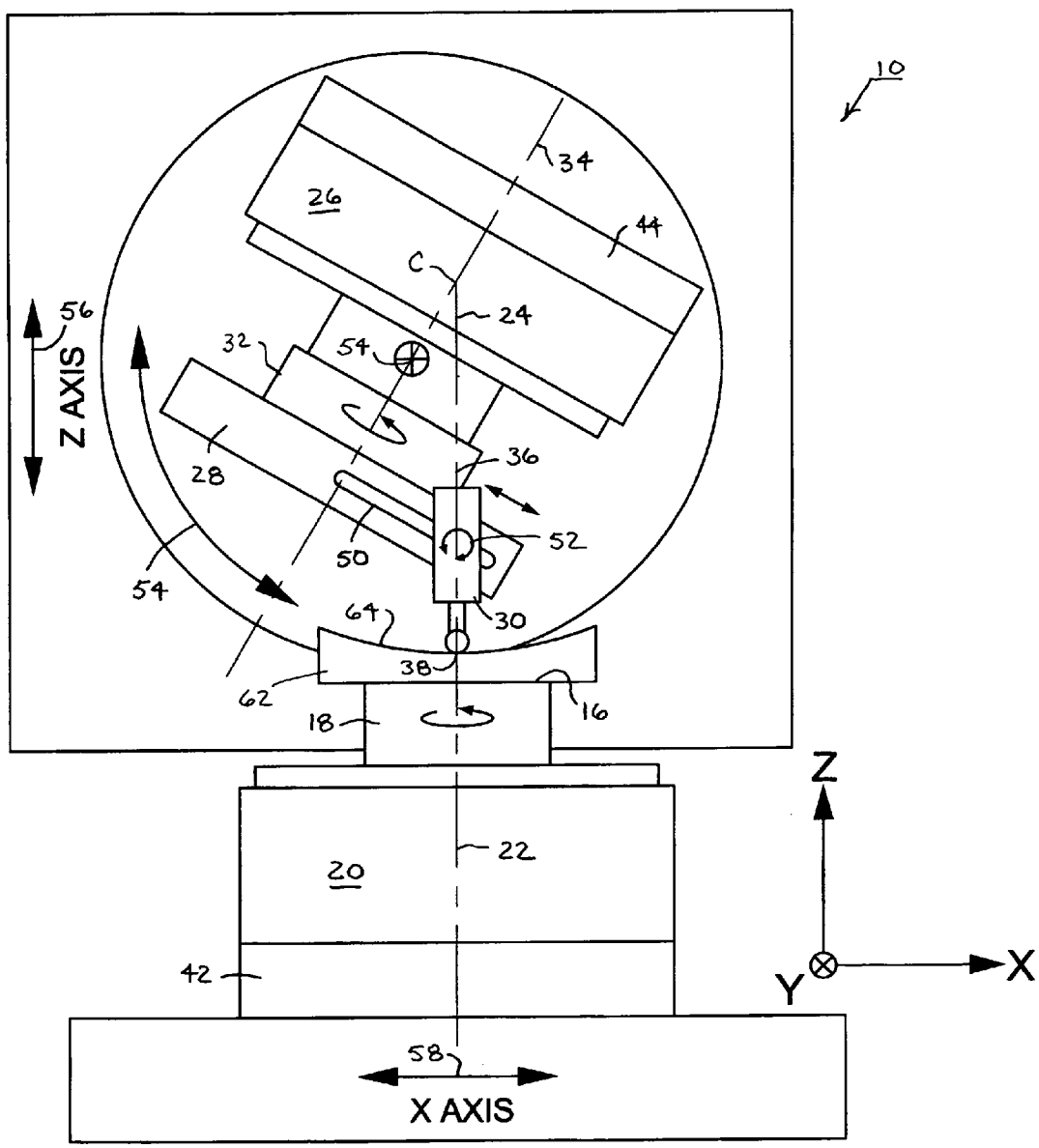
FIG. 3 is a similar diagram showing an arrangement of the setup axes for measuring a concave optical test surface in a generating mode.

A configuration of the measuring instrument 10 for measuring a concave optical surface 64 of a test element 62 is shown in FIG. 3. Most notably, the rotational axis 34 of the probe spindle 32 is shifted in the X-axis direction and intersects the rotational axis 22 on an opposite side of the test element 62. A similar effect could be achieved by rotating the rotational axis 34 along with an appropriate translation for intersecting the rotational axis 22 and 34 at the same center of curvature C of the test optical surface 64. Corresponding angular adjustments are made to the measurement axis 36 so that the measurement axis 36 also intersects the center of curvature C. Similar to the preceding embodiment, the test surface 62 is mounted on the fixture 16 of the work spindle 18 so that its nominal axis of symmetry is aligned with the rotational axis 22 of the work spindle 18. At the rotational position of the displacement-measuring probe 30 shown in FIG. 3, the measurement axis 36 is coincident with both the rotational axis 22 and the nominal axis of symmetry of the concave test surface 64. Rotation of the displacement-measuring probe 30 around the rotational axis 34 together with rotation of the optical test surface 64 around the rotational axis 22 defines at the tip 38 of the measuring probe 30 a spherical datum surface against which the measurements of the displacement-measuring probe 30 are referenced. For maintaining the measurement axis 36 normal to the datum surface, the measurement axis 36 is inclined through the same angle α with respect to the rotational axis 34 as the rotational axis 22 is inclined to the rotational axis 34 through the head angle φ.

Figure 4:
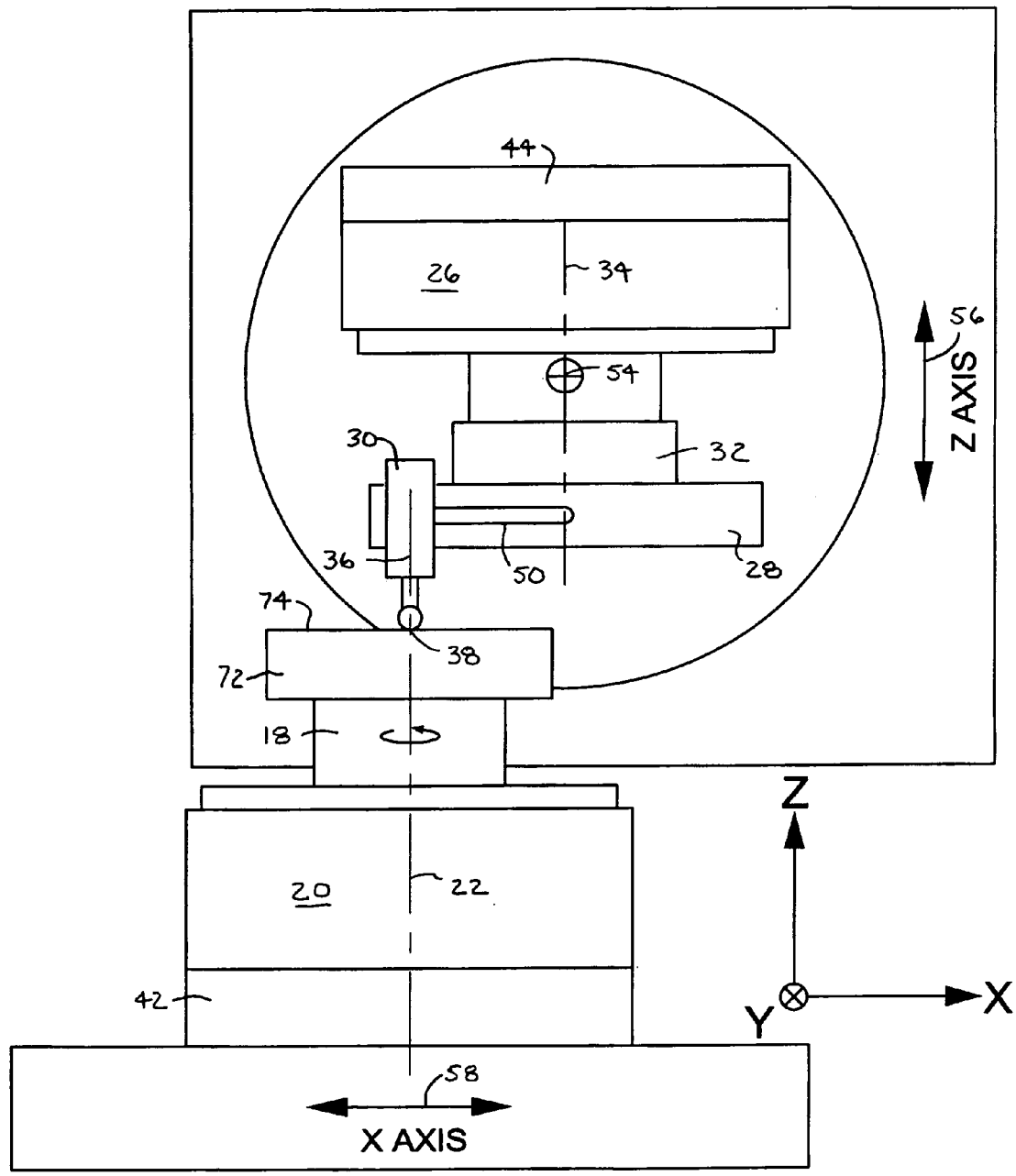
FIG. 4 is a diagram showing a cross-sectional view of an arrangement of the setup axes for measuring a flat optical test surface.

The measuring instrument 10 can also be set up as shown in FIG. 4 for measuring a flat optical surface 74 of a test element 72. Here, both rotational axes 22 and 34 extend parallel to each other. The measurement axis 36 extends parallel to the two rotational axes 22 and 34 for sweeping a cylindrical surface. Rotation of the probe tip 38 around the rotational axis 34 traces a circle. The rotational axis 22 of the work spindle 18 extends normal to this circle, so that the sweep of the circle through space relative to the test surface 14 traces a plane or a sphere having an infinite radius of curvature. Thus, the generating apparatus can define by its two rotations a planar datum surface as an instance of a spherical datum surface having an infinite radius of curvature.

Similar to the proceeding embodiments, the rates of relative rotation between the work spindle 18 and the probe spindle 32 can be selected to optimize a pattern of data acquisition over the test optical surface 74. In the preferred generating mode, both rotational axes 22 and 34 are driven in synchronism, although at different rates. Preferably, the work spindle 18 is rotated at a constant velocity at a rate significantly higher than the rate at which the probe spindle 32 is rotated. For acquiring data in an orderly manner, the rotary drive 26 of the probe spindle axis 32 can be coupled to the constant velocity rotary drive 20 of the work spindle 18 in a master/slave relationship. However, with this or any of the other embodiments described herein, one or the other of the spindles 18 or 32 could be driven in an intermittent manner to collect data from a succession of pre-determined index positions. For example, the probe spindle 34 could be indexed by a prescribed amount following one or more rotations of the work spindle 18. Data concerning the test surface 74 could be gathered in this way as a succession of evenly spaced arcs.

Figures 5A, 5B:
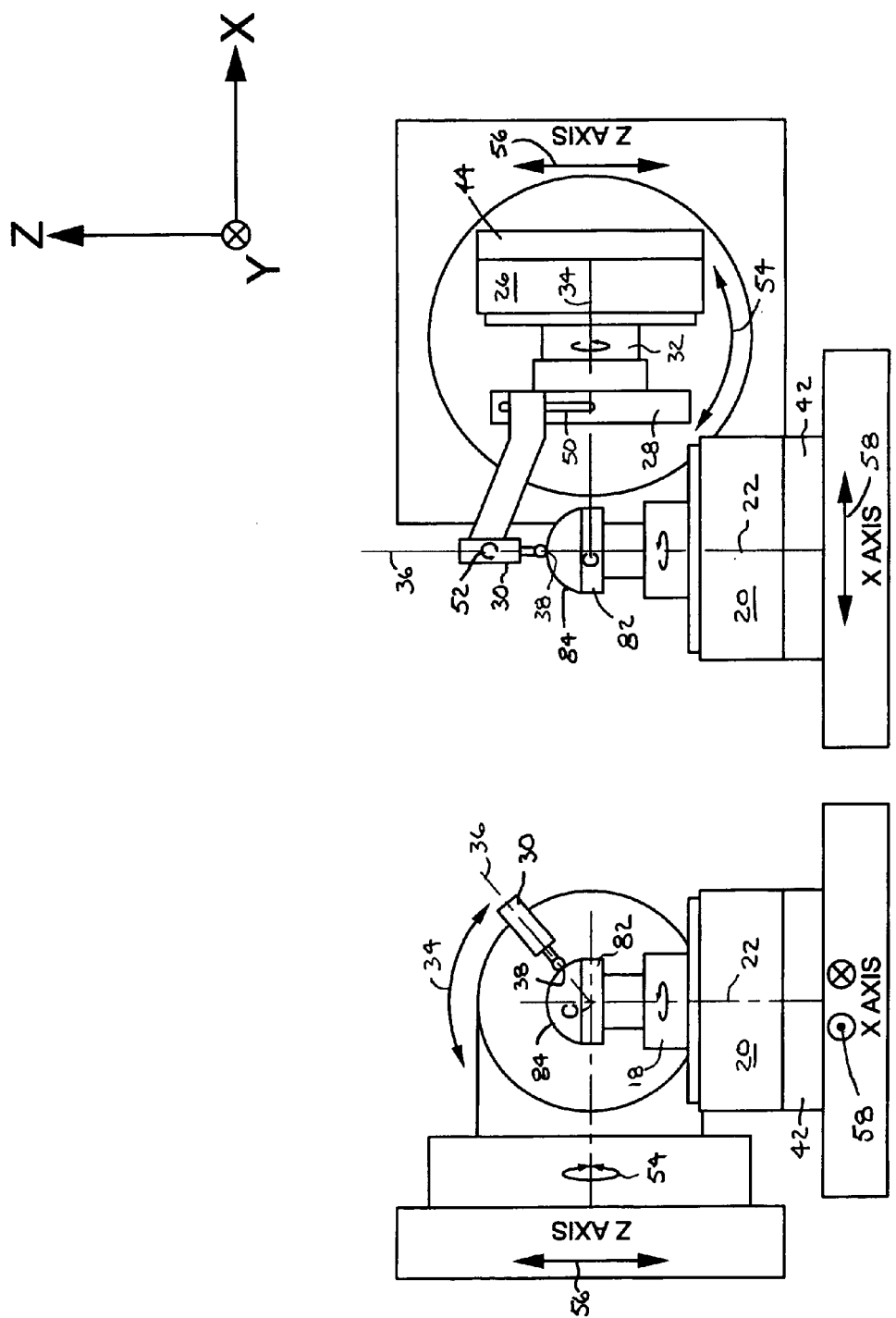
FIGS. 5A and 5B are orthogonal cross-sectional side views of the instrument arranged in a swing arm profiler mode for measuring a convex optical test surface.

A different mode of operation referred to as a swing arm profiler mode is shown in FIGS. 5A and 5B. Here the rotational axis 34 of the probe spindle 32 is oriented at 90 degrees to the rotational axis 22 of the work spindle 18. The measurement axis 36 is also inclined through 90 degrees with respect to the rotational axis 34 of the probe spindle 32. Similar to the proceeding embodiments, the angular adjuster 54 makes the angular adjustment between a rotational axis 22 and 34 for setting the head angle φ at 90°.

In the swing arm mode, full rotation of the displacement-measuring probe 30 around the rotational axis 34 of the probe spindle 32 is not possible because of interference effects between the displacement-measuring probe 30 and the work spindle 18. However, the swing arm mode permits the displacement-measuring probe to remain in proximate contact with the optical test surface, shown here as a convex test surface 84, throughout the measuring operation. Data can be collected from the entire test surface 84 by sweeping the displacement-measuring probe along a single meridian. Intermittent or continuous indexing of the displacement-measuring probe 30 can be used in conjunction with rotation of the test surface 84 to collect the data. Intermittent indexing collects data along predefined latitudes, whereas continuous indexing traces an uninterrupted spiral across the test surface 84. Alternatively, the displacement-measuring probe 30 could be swept along a series of meridians in conjunction with a continuous or intermittent indexing of the test surface 84.

The swing arm profiler mode is also well adapted to the collection of redundant data particularly from differing angular positions of the work and tool spindles 18 and 32. For example, the displacement-measuring probe 30 can be rotated in a first direction, starting at the polar latitude for collecting one set of data, and can be rotated in an opposite direction from the polar latitude for collecting a redundant set of data. Of course, the corresponding range of angles can be measured with the same direction of probe rotation beginning on one side of the fixture 16 and passing through the polar latitude to the other side of the fixture 16. This facilitates alignment of the two rotational axis 22 and 34 during machine setup and also facilitates the use of reversal techniques for error separation.

Figure 6:
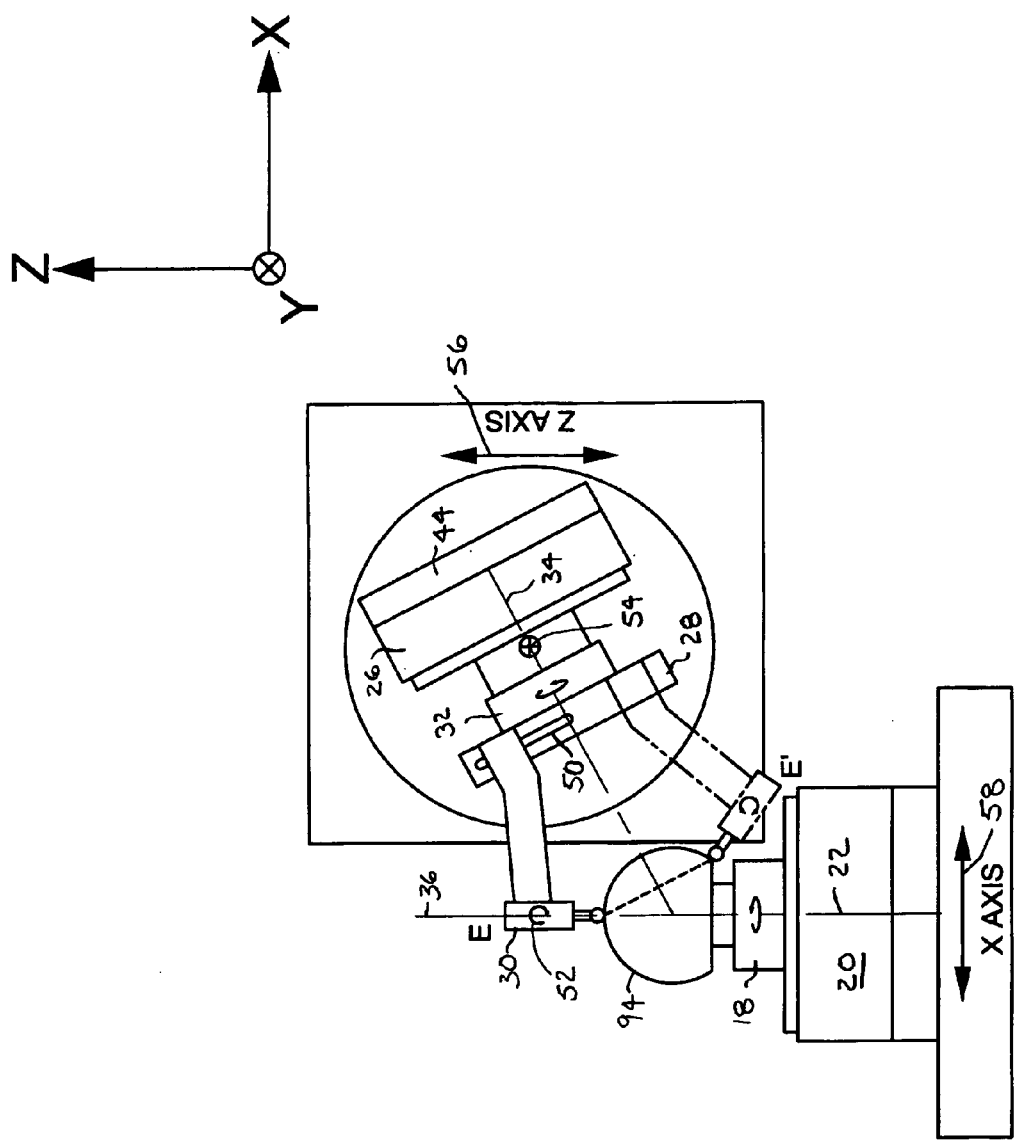
FIG. 6 is a diagram showing a cross-sectional view of the instrument arranged in an optical generator mode for measuring of hyper-hemispheric optical surfaces.
Figures 7A, 7B:
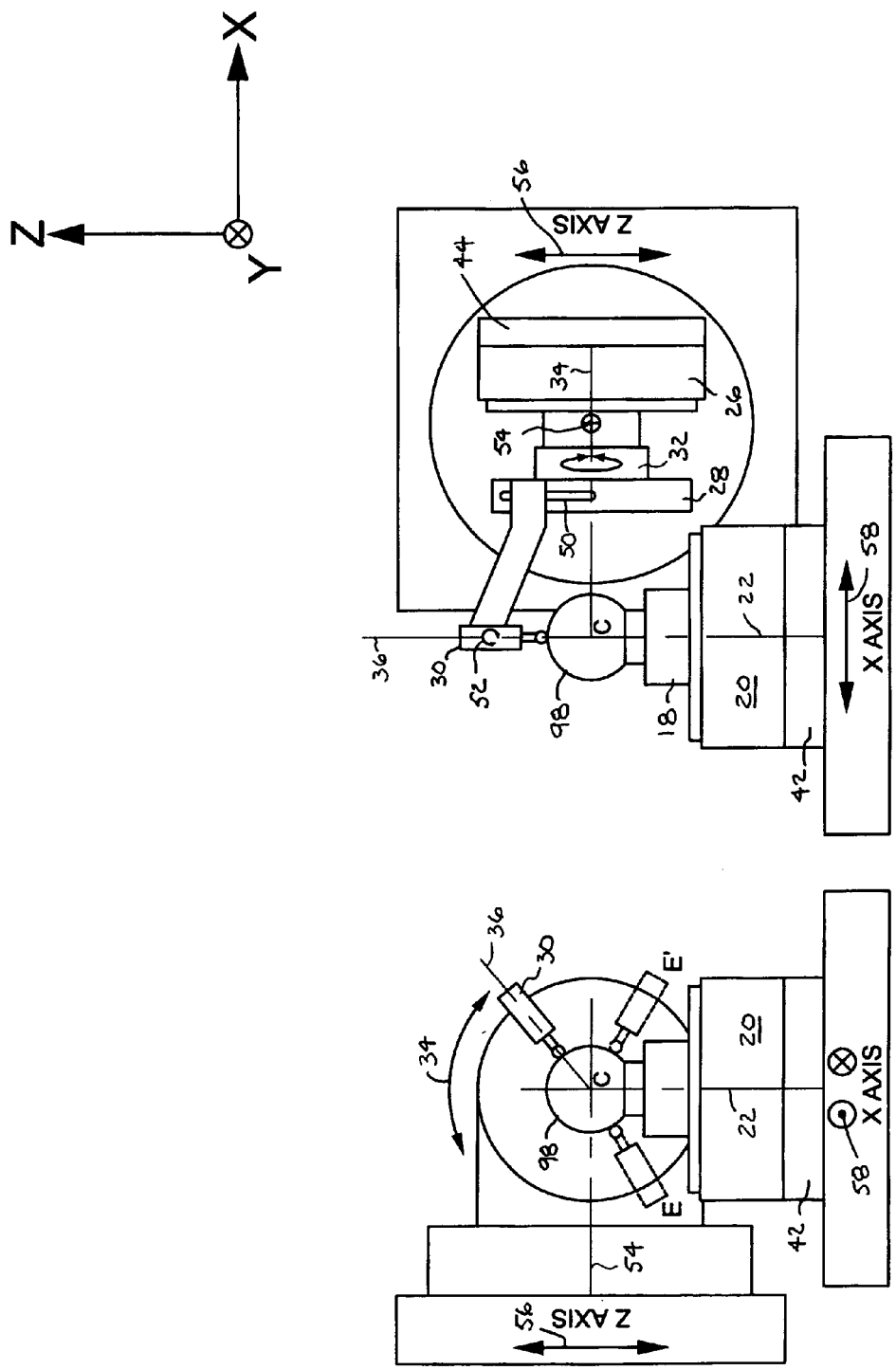
FIGS. 7a and 7b show orthogonal cross-sectional views in which the setup axes are arranged in a swing arm profiler mode for measuring a hyper-hemispherical optical surface.

The measurement of hyper-hemispheric optical surfaces in a generator mode is shown in FIG. 6. The rotational axis 34 of the probe spindle 32 is inclined to the rotational axis 22 of the work spindle 18 through a head angle φ that covers at least one quarter of the angular span of the hyper-hemispheric optical surface 94. However, the amount of head angle φ inclination that can be accommodated while maintaining full rotation of the displacement-measuring probe 30 around the rotational axis 34 (i.e. through positions designated E and E') is limited by interference with the work spindle 18. For measuring hyper-hemispheric test surfaces spanning a greater angular range, the swing arm profiler mode as shown in FIGS. 7a and 7b can be used. The two rotational axes 22 and 34 are oriented at right angles to one another for allowing the displacement-measuring probe 30 to sweep through an expanded angular range of a hyper-hemispheric test surface 98 without contacting the work spindle 18.

For measuring spherical and nominally spherical aspherical optics, only two axes of motion are required to generate an appropriate datum surface. However, the invention also contemplates aspherical optics having a nominal axis of symmetry but departing from the spherical form. Departures of the datum surface from the desired form of the test surface are apparent in two important respects, spatially (i.e., radial deviations) and angularly. The spatial deviation increases the required range of measurement of the displacement-measuring probe 30. This can generally be accommodated by appropriate selection of the probe type. Angular departures incline the measurement axis 36 away from the surface normals. Such inclinations can change the scale of measurement and its resolution, while larger departures can exceed the tolerance of the displacement-measuring probe 30. For example, some optical probes require the retroreflection of light for its collection. Surfaces having normals significantly inclined to the measurement axis 36 reflect light in a different direction. Similar types of limitations affect mechanical probes, where the probe displacement includes a component not in the direction of measurement.

Although the invention normally provides for orienting the measurement axis 36 through the nominal center of curvature C of the optical test surface, the measurement axis 36 can also be inclined through other probe angles a selected to minimize the maximum angular deviation of the measurement axis 36 over the entire datum surface. In addition to adjusting this or other of the setup axes to accommodate variations in the test surface, additional axes of motion can be used. For example, the angular adjustment axis 54 could be operated in synchronism with the rotational axes 22 and 34 to generate a more complex datum surface that better matches the test surface. In addition, intermittent adjustments can be made to any of the setup axes including the angular adjustment of the measurement axis itself to measure the same test surface using two or more different set ups.

Although it is possible in accordance with the invention to impart additional motions or make interim adjustments during measurement, the highest accuracy is achieved by minimizing the number of axes of measurement and utilizing only high performance rotary axes to affect the desired motion. With just the two axes of motion, the instrument can measure test surfaces with base radii of curvature ranging from infinity to a few millimeters in either a convex or a concave form. Test surfaces such as hyper-hemispheres covering large angular regions of space can be measured from a single setup. The instrument also accommodates a wide variety of probes by reducing uncertainties that result from non-normal operation of such probes.

The various configurations and operating modes of the invention also provide for the accumulation of redundant data for identifying and eliminating systematic errors appearing in the measurement data. The generating mode is particularly well suited to the accumulation of large amounts of redundant data. The swing arm mode is particularly well suited for collecting data from the same points on the test surface but at different angular positions of the rotational axes. Errors such as drift during measurement due to effects such a spindle of growth can also be eliminated by repeatedly measuring the vertex of the optical test surface throughout the measurement. Redundant data collected in other points can be interpreted for eliminating other kinds of errors, including error motions of the rotary axes and angular positioning errors, for measuring test optical surfaces with improved accuracy and reliability. The redundant data also helps to minimize statistical variations.

The invention claimed is:

1. An instrument for measuring spherical and aspherical optical surfaces comprising:
   an optical generating apparatus having two relatively inclined rotational axes that relatively rotate a displacement-measuring probe with respect to an optical test surface for generating a datum surface against which displacement measurements between the displacement-measuring probe and the test surface are referenced;
   the displacement-measuring probe having a measurement axis that is linearly offset and inclined with respect to one of the rotational axes for maintaining the measurement axis of the displacement-measuring probe substantially normal to the test surface while generating the datum surface; and
   a first angular adjustment axis for angularly adjusting the two rotational axes with respect to each other.

2. The instrument of claim 1 further comprising a second angular adjustment axis for angularly adjusting the displacement-measuring probe with respect to one of the two rotational axes for orienting the measurement axis normal to the test surface.

3. An instrument for measuring spherical and aspherical optical surfaces comprising:
   an optical generating apparatus having two relatively inclined rotational axes that relatively rotate a displacement-measuring probe with respect to an optical test surface for generating a datum surface against which displacement measurements between the displacement-measuring probe and the test surface are referenced;
   the displacement-measuring probe having a measurement axis that is linearly offset and inclined with respect to one of the rotational axes for maintaining the measurement axis of the displacement-measuring probe substantially normal to the test surface while generating the datum surface; and
   sensors that monitor error motions of at least one of the rotational axes to compensate for deviations in the generated datum surface from a desired datum surface.

4. A method of measuring optical test surfaces having a nominal axis of symmetry comprising the steps of:
   relatively rotating a displacement-measuring probe with respect to an optical test surface around two relatively inclined rotational axes so that the relative motion of the displacement-measuring probe traces a datum surface against which the optical test surface is measured;
   orienting a measurement axis of the displacement-measuring probe with respect to one of the two rotational axes so that the measurement axis remains substantially normal to the optical test surface while tracing the datum surface; and
   measuring overlapping areas of the optical test surface from different rotational positions of the rotational axes to collect redundant data; and
   processing the redundant data for detecting systematic errors.

5. A method of measuring optical test surfaces having a nominal axis of symmetry comprising the steps of:
   relatively rotating a displacement-measuring probe with respect to an optical test surface around two relatively inclined rotational axes so that the relative motion of the displacement-measuring probe traces a datum surface against which the optical test surface is measured;
   orienting a measurement axis of the displacement-measuring probe with respect to one of the two rotational axes so that the measurement axis remains substantially normal to the optical test surface while tracing the datum surface;
   measuring overlapping areas of the optical test surface from different rotational positions of the rotational axes to collect redundant data; and
   processing the redundant data for minimizing statistical errors.

* * * * *